United States Patent [19]

Ballard

[11] 4,415,939

[45] Nov. 15, 1983

[54] HEAD POSITIONING SERVO FOR DISK DRIVE

[75] Inventor: Douglas F. Ballard, South Ogden, Utah

[73] Assignee: Iomega Corporation, Ogden, Utah

[21] Appl. No.: 257,608

[22] Filed: Apr. 27, 1981

[51] Int. Cl.³ .................... G11B 21/02; G11B 21/10
[52] U.S. Cl. .................................... 360/75; 360/77
[58] Field of Search ................. 360/75, 78, 77, 135, 360/97, 98, 99

[56] References Cited

U.S. PATENT DOCUMENTS

| | | | |
|---|---|---|---|
| 3,691,543 | 9/1972 | Mueller | 340/174.1 |
| 3,818,502 | 6/1974 | Chien et al. | 360/77 |
| 3,893,180 | 7/1975 | Braun et al. | 360/77 |
| 4,134,053 | 1/1979 | Klinger | 360/75 |
| 4,146,911 | 3/1979 | Gyi | 360/75 |
| 4,149,200 | 4/1979 | Card | 360/75 |

FOREIGN PATENT DOCUMENTS

2126698 9/1972 France .
2198209 3/1974 France .
2256499 7/1975 France .

OTHER PUBLICATIONS

IBM Technical Disclosure Bulletin, vol. 20, No. 8, Jan. 1978 "Sector Servo Method", R. L. Deremer, R. E. Jansen, J. P. Ho.
"Position Signal Detection Circuit", K. K. Fujitsu, Masateru Sasaki, 55-73972 Patent Abstracts of Japan, vol. 4, No. 118 (p.-24) (500) 8/22/80, p. 50P24.

Primary Examiner—Robert Martin Kilgore
Attorney, Agent, or Firm—Woodcock, Washburn, Kurtz, Mackiewicz & Norris

[57] ABSTRACT

An improved servo encoding scheme and demodulation circuit for control of the position of a read/write head with respect to a magnetic recording disk is disclosed. First and second signals of like polarity are recorded preceding each data field on the sector of the disk. The signals are summed to provide automatic gain control to the servo loop to compensate for variations in read-back amplitude, while the difference between the two signals is measured and used to provide an indication of departure of the head from the center of the disk track.

2 Claims, 6 Drawing Figures

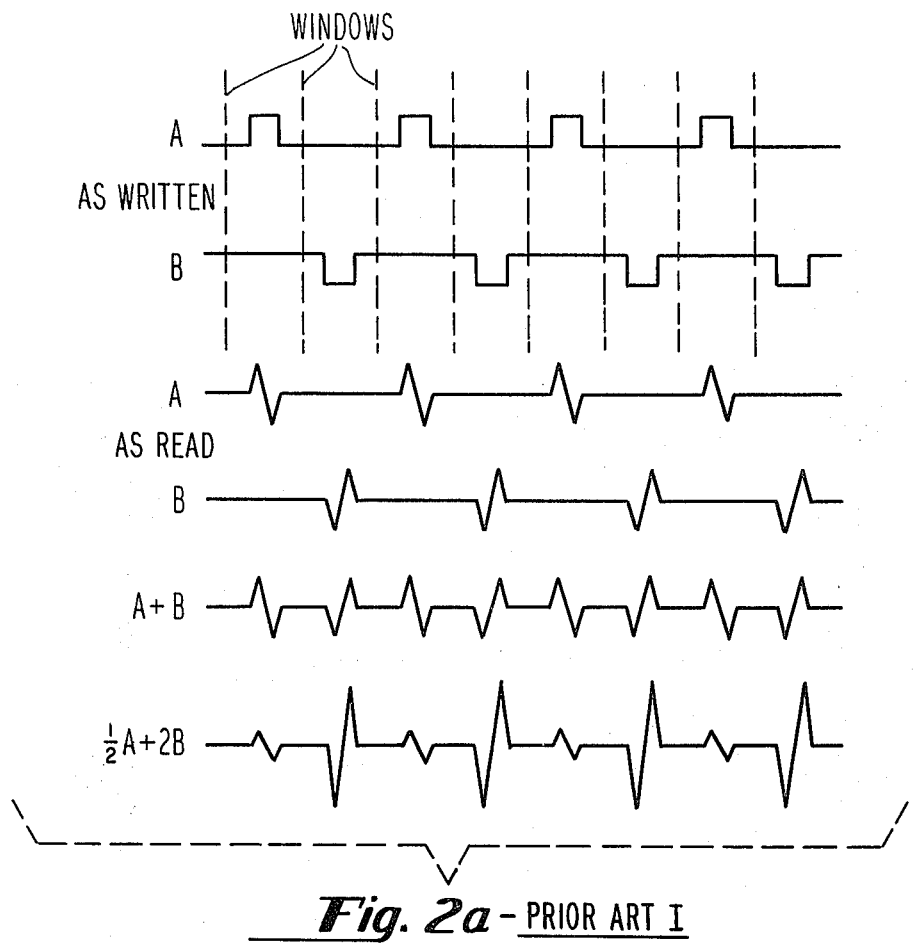
*Fig. 2a* – PRIOR ART I
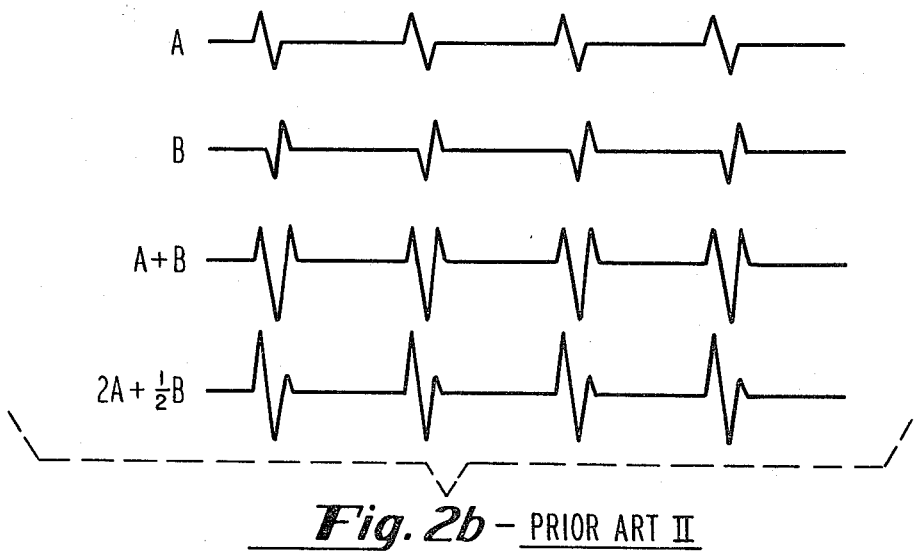
*Fig. 2b* – PRIOR ART II

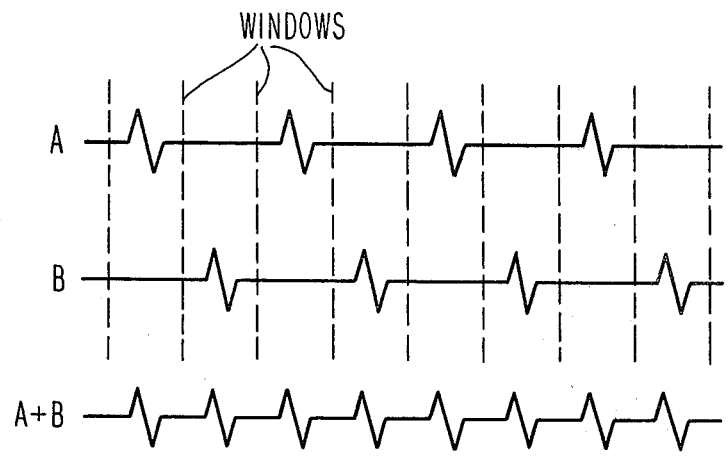
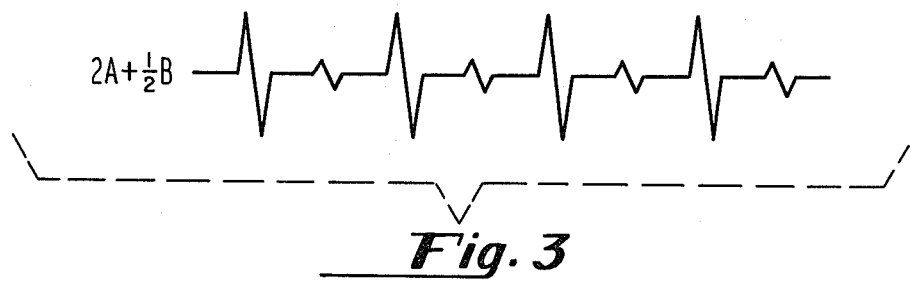
Fig. 3
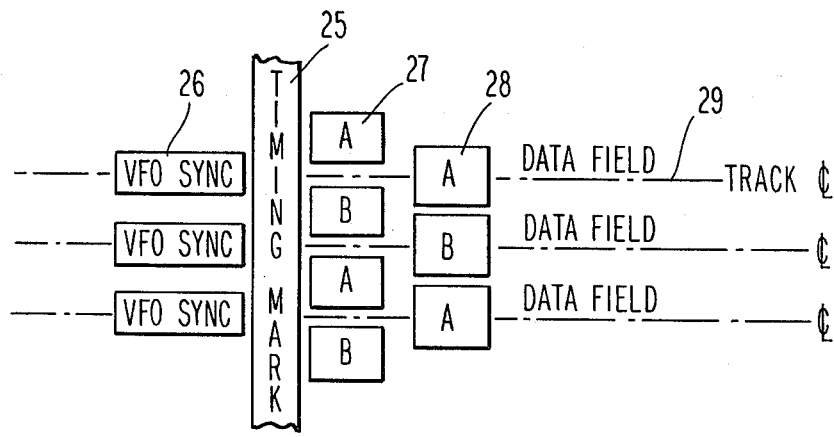
Fig. 4

HEAD POSITIONING SERVO FOR DISK DRIVE

FIELD OF THE INVENTION

This invention relates to the field of magnetic disk drives. More particularly, the invention relates to a servo encoding scheme and demodulation system for controlling the motion of a read/write head with respect to a magnetic disk.

BACKGROUND OF THE INVENTION

In magnetic disk drives of the type in which a read/write head is moved inwardly and outwardly with respect to the disks in order to access various portions of the disk surface, it is usual to control the relative position of the read/write head by use of a servo circuit which utilizes information permanently encoded on the disk as an input to a circuit which compares this input with a command input to it by control circuitry. There are several different types of encoding schemes and associated circuitry found in the art. One involves the coding of one surface of a plurality of rigidly connected disks with servo positioning information only. Many or all of the tracks on the surface are entirely written with position information. In a second scheme, a blank disk is prewritten with position servo information at points spaced about the surface of the disk, interspersed by fields for the storage of data. The present invention is of this type.

It will be appreciated by those skilled in the art that among the objectives of a servo design are ease of manufacture of the circuitry and, in the case of a servo circuit in which position information is written permanently to portions of the disk, ease of this writing. Further, the scheme should be such that the design of the circuit is relatively easily implementable and does not require, for example, synchronization of detection mechanisms which require expensive or high tolerance components.

OBJECTS OF THE INVENTION

Accordingly, it is an object of the invention to provide a servo encoding scheme and demodulation circuit for the control of the motion of a read/write head with respect to a magnetic disk which can be readily manufactured using relatively inexpensive components.

It is a further object of the invention to provide an improved servo encoding scheme and demodulation circuit for control of a read/write head motion.

Yet control object of the invention is to provide an inexpensive and readily manufactured, yet highly accurate servo position circuit.

Other aspects and objects of the invention will appear to those skilled in the art.

SUMMARY OF THE INVENTION

The invention fulfills the above needs of the art and objects of the invention by its provision of a servo code demodulation circuit which simultaneously adds and subtracts comparative position information of identical polarity permanently encoded on a disk. An automatic gain control circuit is used to control the amplitude of the two position signals so as to maintain their sum constant, while the difference is used as the position error signal, such that when the difference drops to zero, the read/write head is properly centered over the disk track. The circuit is readily implemented by components which do not require exacting tolerance and the servo position data written is such that elaborate circuitry is not required to decode the position information.

BRIEF DESCRIPTION OF THE DRAWINGS

The invention will be better understood if reference is made to the accompanying drawings, in which:

FIGS. 2A and 2B show two prior art servo data patterns;

FIG. 3 shows the comparable servo data pattern according to the invention;

FIG. 4 shows a view of the coding of the servo position data shown in FIG. 3 as it appears on the disk.

DESCRIPTION OF THE PREFERRED EMBODIMENTS

Figure 1:
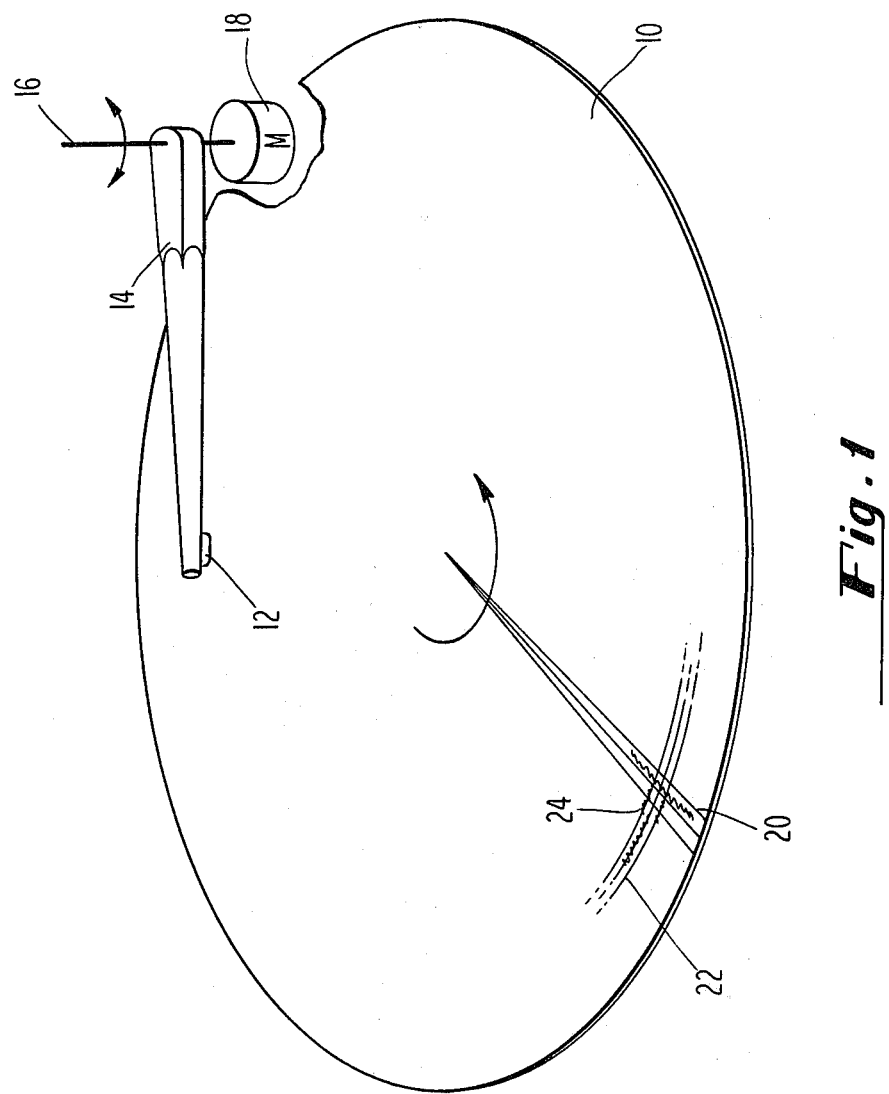
FIG. 1 shows an overview of the disk drive using the circuit of the invention.

Referring now to FIG. 1, a magnetic disk 10 is shown rotating about its axis and in close juxtaposition to a magnetic read/write head 12. The read/write head 12 is supported by an arm 14 which is rotated about an axis 16 by a servo motor 18. The motor 18 is controlled by information permanently encoded on the disk 10 and detected by the head 12 in accordance with the invention. As noted, the information written on the disk includes a plurality of timing marks 20 which are permanently written across the disk without regard for track disposition; additionally, each track 22 contains servo position information 24, detailed below.

As will be apparent to those skilled in the art, servo positioning information is relevant to control of the motion of the servo arm 14 carrying the head 12 across the surface of the disk, but is also relevant to insure that the head 12 stays centered over a particular disk track once located. The present invention relates to generating a signal indicative of whether the head is centered over the track. In a related application, Ser. No. 257,484 filed Apr. 24, 1981, the question of using the position signal generated according to the present invention to control the motion of the head as it is moved from one track to another is addressed.

Two prior art schemes for servo position information coding are shown in FIG. 2. In the first scheme, shown in FIG. 2A, pulses are shown as written having generally rectangular shape. Two series of pulses denominated A and B are shown. The A pulses begin with an upward transition, whereas the B pulses begin with a downward transition. They are interspersed with one another in time but are written on adjacent areas of the disk; that is, the horizontal direction in FIG. 2A may be considered to be along the length of the disk track. The rectangular pulses of FIG. 2A as written are effectively read as shown; essentially what is detected is the energy of the pulse. It will be noted that the line denominated "A-as read" shows a pulse which first rises above zero then drops below zero, coincident with the transitions of the "A-as written" pulse. Similarly, the "B-as written" pulse is downwards, hence the downward portion of the "B-as read" pulse appears first. Thus, when the A and B as read pulses are summed, pairs of upward transitions are followed by pairs of downward transitions. The A and B summation shown is what is detected when the head is centered over the A and B tracks equally. When the head is instead disposed in the B direction, as shown in the lowermost line of FIG. 2A, which is symbolized $\frac{1}{2}$A+2B to indicate that the disposition is in the B direction, the B pulses predominate. This can be detected by conventional circuitry and used to provide a position error signal to, e.g., bias the head more closely to the center line of the disk track.

This scheme is useful and has the advantage that it is simple to prepare the disk by permanently encoding the A and B pulses shown. In particular, it offers the advantage that their timing is not critical as long as the B pulses are generally interspersed between the A; that is, simultaneity of transition is not required. However, the fact that both positive and negative pulses are used poses a difficulty in that differing sorts of detectors must be used to appropriately detect these signals, and accordingly calibration is required in order that the signal amplitudes are accurately measured.

FIG. 2B shows a second prior art scheme. Here, the A and B pulses are written such that the negative-going transitions coincide with one another. In this way, when the head is properly centered, the positive pulses are equal. When the head is displaced from the track center line, such as in the A direction, as shown, the first positive transition is thus greater than the second positive transition, and this can be used to derive a position error signal. Here, then it is only the positive information that one is concerned with, which simplifies the circuitry somewhat. However, the difficulty with this approach is that the timing of the negative going transitions of the A and B signals must be written simultaneously, which is somewhat more difficult to implement in practice.

The scheme used according to the present invention is shown in FIG. 3. Here both A and B are of the same shape; that is, the positive transition is first, which allows the same circuitry to be used to measure the energy of both pulses. Further, the A pulses are disposed evenly between the B pulses so that timing of any transition is not critical. This allows the writing of A and B pulses to the disk to be accomplished economically. As long as the head is properly centered over the track, the result is a series of pulses of equal amplitude and energy.

It will be appreciated by those skilled in the art that the amplitude of the pulses as read will vary with the height of the head from the disk as well as with the centering of the head with respect to the track. Accordingly, it is important to apply an automatic gain control signal to the pulses so as to compensate for head height variations. A+B can be used in the circuit of the invention to derive such an automatic gain control signal, since the value of A+B is the same regardless of whether the head is centered with respect to the disk or not. That is, while A or B may be relatively greater than the other, their sum is the same. Accordingly, A+B can be used to control the amplification of the signal used to derive the center of the track. A and B are equal when the head is properly centered with respect to the track, that is, A−B=0. Therefore, when the head is displaced, for example, in the A direction, the A pulses are much larger than the B pulses, which fact can then be used to generate a position error signal in a relatively simple fashion which will be detailed below in connection with FIG. 5. One need only "know" which is A and which B; this is determined by utilization of the timing mark.

FIG. 4 shows details of the position servo information as written on the disk. As noted above, this position information is written on the disk at its point of manufacture and remains permanently encoded thereon. The disk is divided by timing marks 25 which extend from the center of the disk outwardly and do not vary with respect to radial position; that is, they do not themselves define the radial position of the tracks. In the preferred embodiment, 70 timing marks divide the disk into 70 sectors. The timing mark 25 with respect to each track is preceded by a variable frequency oscillator synchronization field 26 used to adjust the read clock frequency in accordance with the velocity of the disk. The timing mark 25 is followed by the position servo information 27 as discussed above in connection with FIG. 3. The A and B signals are each written on either sides of the center lines 29 of the tracks. Thus, when the head is properly centered over the track, it detects equal amounts of the signals written to both A and to B. The A and B fields 27 which are disposed between the center lines of the tracks are followed by similar A and B fields 28 disposed on the center lines of the tracks 29. These "quadrature fields" 28 are used as are the normal fields 27, but are only employed when the head is disposed entirely between the track center lines 29. In a preferred embodiment of the disk drive according to the invention, the head width is 3.15 mils while the track spacing is 3.7 mils. Accordingly, if the head is disposed entirely between the track center lines 29, it reads only A or B of the normal fields 27 and thus cannot operate as described above. In these circumstances, the A and B quadrature fields 28 disposed on the track center lines can be used to control the servo head. The position servo information is then followed by data fields for each track, as noted on FIG. 4.

Figure 5:
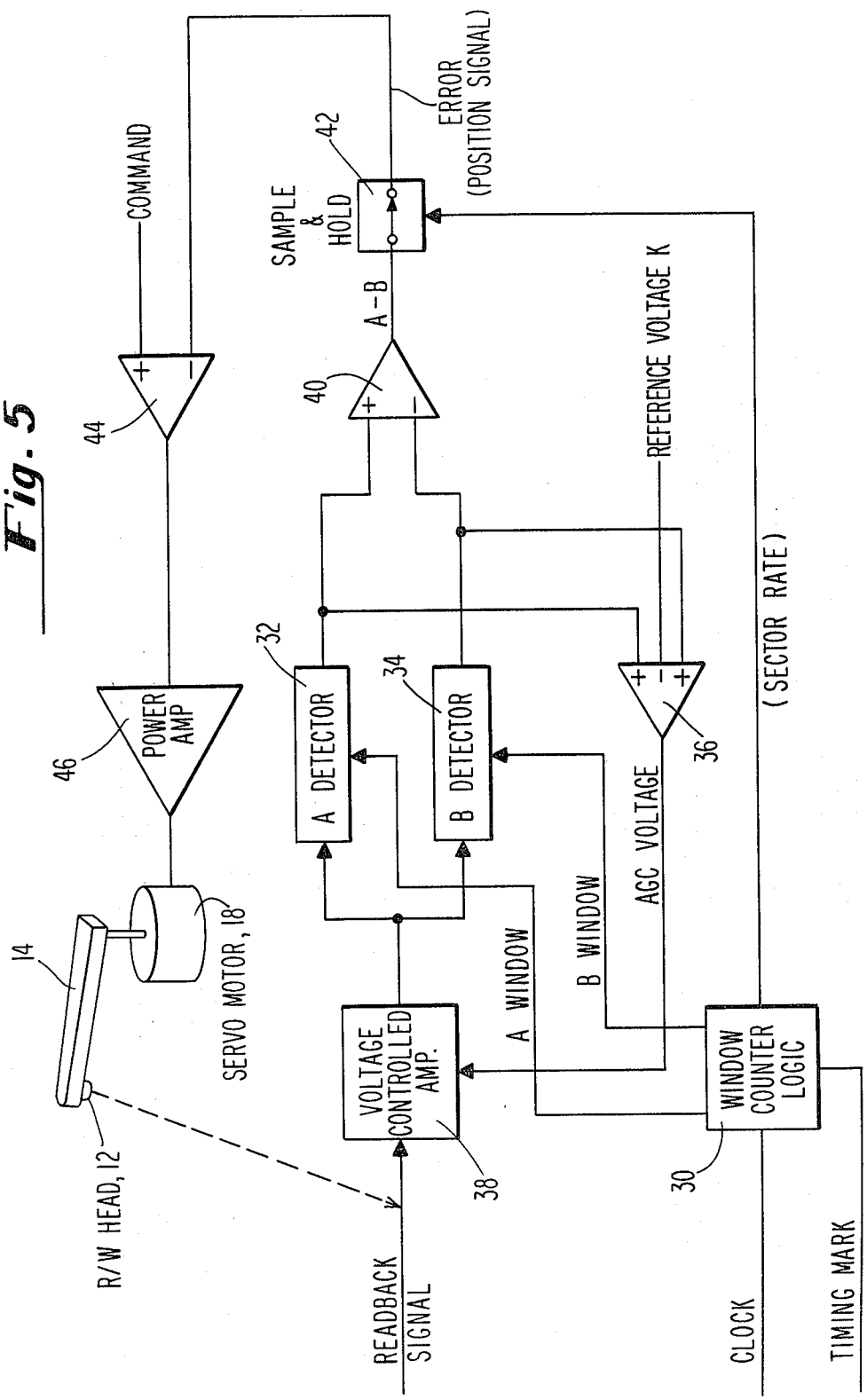
FIG. 5 shows a block diagram circuit for providing the position error signal according to the invention.

FIG. 5 shows a circuit for controlling the position of the read/write head 12 with respect to the disk track. Window counter logic 30 is provided which sequentially enables A and B detectors 32 and 34, respectively, upon initialization by the supply of the timing mark to the window counter logic 30. This input, together with the read clock signal from the data channel, indicates at what times the A and B signals can be expected to be present. The outputs of the detectors 32 and 34 are summed in a summing mode 36. This A+B signal is compared with a constant value K in an automatic gain control loop to control the amplification provided by a voltage controlled amp 38 which amplifies the read back signal supplied to the detectors 32 and 34. This maintains a constant value of A+B independent of head flying height variations and the like, and allows the amplitudes of A and B to be compared reliably to one another for position error determination. The outputs of the detectors 32 and 34 are also differenced in a differential amplifier 40, thus providing the A−B signal which is then stored in a sample and hold circuit 42. As noted above, when the head is disposed in the center of the disk track, A−B is zero. Hence, the position signal is zero. It is passed to a comparator and compensator 44 where it is compared with a command signal. If no further motion of the head is desired, i.e., the command signal is also zero, the output of the comparator and compensator 44 to the power amplifier 46 is zero. The output of the power amplifier 46 is supplied to the servo motor 18 which moves the servo arm 14, which carries the read/write head 12, which in turn supplies new servo position information to the voltage controlled amplifier 38.

Those skilled in the art will recognize that while there has been described a servo circuit and method for control of the position of a read/write head with respect to a magnetic recording disk, having servo information written only at the beginnings of data sectors, there are possible additional embodiments of the invention and the above disclosure should not therefore be read as a limitation on the scope of the invention, but as merely exemplary thereof. Instead, the scope of the invention is limited only by the following claims.

I claim:

1. Apparatus for the control of the position of a read/write head with respect to a magnetic recording disk, said disk having recorded thereon at regular intervals first and second position signals of identical polarity, said apparatus comprising:

servo motor means for moving said head with respect to said disk;

a first summing means for adding successive ones of said first and second position signals, and for controlling variable amplification of said signals in accordance with the value of said sum; and comparator means for comparing the values of successive ones of said first and second signals and for generating a servo signal applied to said motor as a result of said comparison, such that said first and second signals tend to be equalized.

2. Method of control of the position of a read/write head with respect to first and second position information signals of identical polarity permanently recorded on a magnetic recording surface, said first and second signals being spaced from one another on said surface, comprising the steps of:

summing pairs of said first and second signals and controlling variable amplification of said signals in accordance with said sum such that said sum remains substantially constant; and comparing pairs of said signals to one another and controlling the position of said head with respect to said signal such that the difference between said signals is minimized.

* * * * *